June 24, 1924.
W. E. COFFIN
1,498,540
COUPLER SHANK AND YOKE CONNECTION
Filed May 13, 1921
Fig. 1
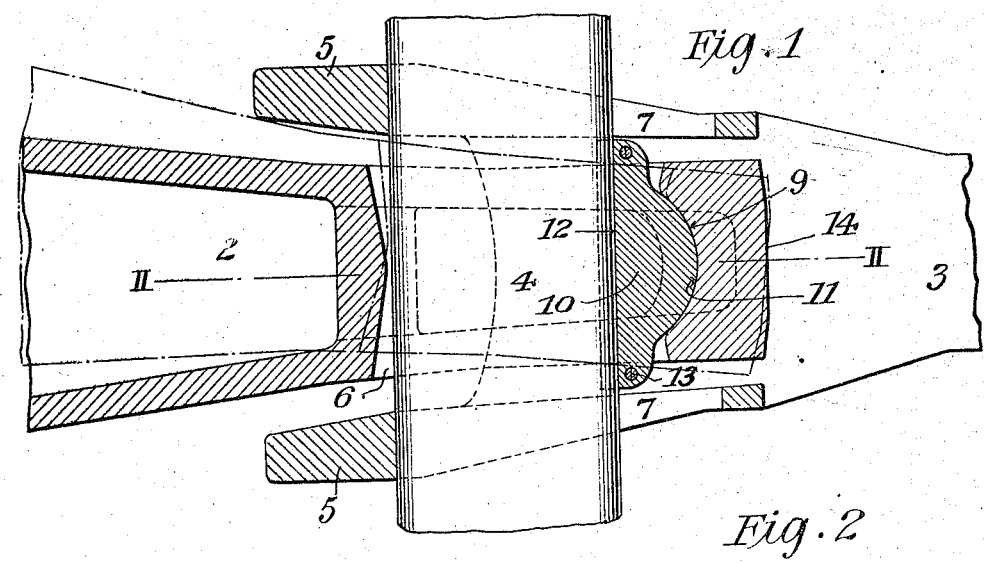
Fig. 2
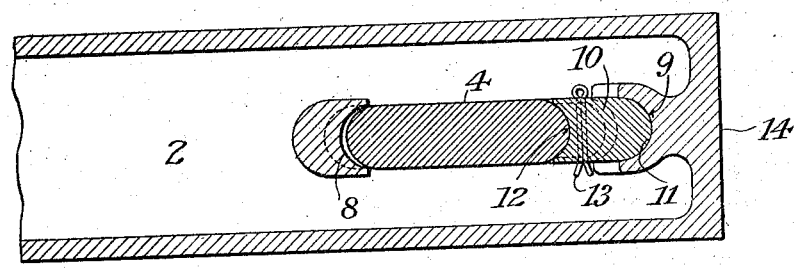
Fig. 3
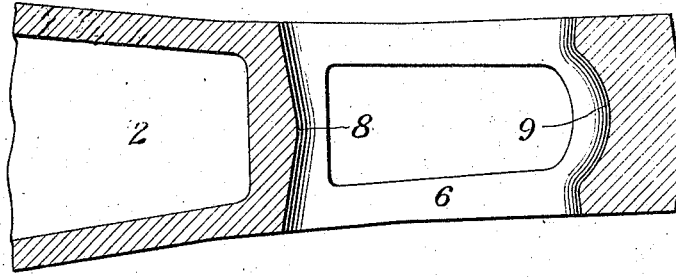
Fig. 4
Inventor
Walter E. Coffin
By his Attorney
Clarence D. Kerr Patented June 24, 1924.

1,498,540

UNITED STATES PATENT OFFICE.

WALTER E. COFFIN, OF CLEVELAND, OHIO, ASSIGNOR, BY MESNE ASSIGNMENTS, TO NATIONAL MALLEABLE AND STEEL CASTINGS COMPANY, OF CLEVELAND, OHIO, A CORPORATION OF OHIO.

COUPLER SHANK AND YOKE CONNECTION.

Application filed May 13, 1921. Serial No. 469,230.

*To all whom it may concern:*

Be it known that I, WALTER E. COFFIN, a citizen of the United States, residing at Cleveland, Cuyahoga County, Ohio, have invented new and useful Improvements in Coupler Shank and Yoke Connections, of which the following is a specification, reference being had to the accompanying drawings, in which—

Fig. 1 is a horizontal section showing the application of my invention to a coupler shank; Fig. 2 is a section on lines II—II of Fig. 1; Fig. 3 is a section similar to Fig. 1, but of the coupler shank alone; and Fig. 4 is a detail of the equalizing member.

My invention relates to coupler shank and yoke connections and is particularly designed to provide a connection that under angling conditions will permit the connecting key to bear equally on both of the forwardly extending sides of the yoke. My invention also comprises the construction and arrangement of the various features which I shall hereinafter describe and claim.

Referring to the drawings, 2 indicates the coupler shank, 3 the yoke, and 4 the connecting key. The coupler shank 2 and the forwardly extending sides 5 of the yoke 3 have horizontal registering apertures or slots 6 and 7, respectively, therethrough. The slot 6 in the coupler shank has its front face 8 bevelled forwardly on each side of the coupler center line, and its rear face 9 is concave in a horizontal plane. Both front and rear surfaces 8 and 9 are also concave in vertical planes. Seated in the concave face or bearing 9 is an equalizer member 10, the rear face 11 of which is convex in two directions to correspond with the surface 9, and its forward face 12 is concave in a vertical direction. The member 10 may be held in position in the shank 2 by the cotter keys 13, which extend above and below the slot 6 and prevent accidental removal of the member 10 from the slot 6 when the connecting key 4 is not in place. The forward and rear sides of the connecting key 4 are convex to correspond with the concave face 8 in the slot 6 and the concave face 12 of the member 10. The rear end 14 of the coupler shank is bevelled at the corners so as to provide a flat bearing surface between shank and draft gear (not shown) under angling conditions.

In assembling the coupler shank and yoke connection the equalizer member 10 is first inserted in the bearing 9 of the slot 6 in the shank 2, and the cotter keys 13 are inserted to hold member 10 from accidental displacement. The coupler shank is next placed between the forwardly extending jaws 5 of the yoke 3 and the connecting key 4 is then inserted through the slots 6 and 7 between the concave face 8 of the shank and the concave face 12 of the member 10.

When the coupler angles laterally the shank will rotate about the convex bearing 11 on the member 10, and as the pressure imposed upon the member 10 holds it snugly against the rear face of the key 4, it will cause the key to bear equally against the forward faces of the slots 7 in both jaws 5 of the yoke 3.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a coupler shank and yoke connection, a coupler shank and yoke having horizontal aligned slots therein, a connecting key in said slots and an equalizer in the slot in the shank between the key and the rear end of the shank, the slot in the shank having at its rear end a concave surface to afford a rotative bearing for the equalizer, and at its forward end a bearing for the key in the axis of the shank, the forward side edges of the slot being spaced forward from the said bearing to permit angling of the coupler relative to the connecting key.

2. In a coupler shank and yoke connection, a coupler shank and yoke having horizontally aligned slots therein, a connecting key seating in said slots, and an equalizer in the slot in the shank between the key and the rear end of the shank, the slot in the shank having at its rear end a concave surface to afford a rotative bearing for an equalizer and at its forward end walls flaring forwardly from the coupler center line to permit angling of the coupler relative to the connecting key.

WALTER E. COFFIN.